United States Patent
Seo et al.

(10) Patent No.: US 9,643,288 B2
(45) Date of Patent: May 9, 2017

(54) HEAT EXCHANGE REACTOR USING THIN PLATE PROVIDED WITH FLOW PATH THEREIN AND METHOD OF MANUFACTURING THE SAME

(71) Applicant: Korea Institute of Energy Research, Daejeon (KR)

(72) Inventors: Dong Joo Seo, Daejeon (KR); Wang Lai Yoon, Daejeon (KR); Woohyun Kim, Daejeon (KR); Un Ho Jung, Daejeon (KR); Kee Young Koo, Daejeon (KR); Sang Ho Park, Daejeon (KR); Young Jae Hwang, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 219 days.

(21) Appl. No.: 14/568,283

(22) Filed: Dec. 12, 2014

(65) Prior Publication Data
US 2016/0144467 A1 May 26, 2016

(30) Foreign Application Priority Data
Nov. 20, 2014 (KR) ........................ 10-2014-0162493

(51) Int. Cl.
*B23P 15/26* (2006.01)
*B01J 19/00* (2006.01)
(Continued)

(52) U.S. Cl.
CPC ........... *B23P 15/26* (2013.01); *B01J 19/0093* (2013.01); *F28D 9/0068* (2013.01); *F28F 3/048* (2013.01);
(Continued)

(58) Field of Classification Search
CPC ......... B23P 15/26; B21D 53/02; B21D 53/04; B21D 53/045; F28F 3/08; F28F 3/086; F28F 3/14; F28F 3/048
See application file for complete search history.

(56) References Cited

U.S. PATENT DOCUMENTS

| | | | |
|---|---|---|---|
| 2007/0261873 A1 | 11/2007 | Berse | |
| 2008/0185420 A1* | 8/2008 | Swallow | ............ B23K 20/1205 228/125 |

FOREIGN PATENT DOCUMENTS

| | | | |
|---|---|---|---|
| JP | 2001-183078 A | 7/2001 | |
| JP | 2011-126756 A | 6/2011 | |

(Continued)

OTHER PUBLICATIONS

Korean Patent Office, Office Action issued on Feb. 18, 2016 against the corresponding Korean Application No. 10-2014-0162493. No translation.

*Primary Examiner* — Christopher Besler
(74) *Attorney, Agent, or Firm* — Hammer & Associates, P.C.

(57) ABSTRACT

Disclosed are a heat exchange reactor and a method of manufacturing the same, and a method of manufacturing a heat exchange reactor includes: preparing lateral plates provided with a plurality of slits formed in parallel in a longitudinal direction; disposing two lateral plates to be spaced apart from each other while facing each other in a vertical direction; forming a plurality of flow path channels by inserting flow path partition plates into one or more slits of the two lateral plates in a horizontal direction; forming a plurality of flow path channels by inserting printed circuit heat exchange plates, which autonomously include one or more heat exchange flow paths therein, into one or more slits of the two lateral plates in a horizontal direction; and (Continued)

bonding the lateral plates, the flow path partition plates, and the printed circuit heat exchange plates.

9 Claims, 7 Drawing Sheets

(51) Int. Cl.
    *F28F 3/04*          (2006.01)
    *F28F 9/02*          (2006.01)
    *F28D 9/00*         (2006.01)
    *B21D 53/04*        (2006.01)

(52) U.S. Cl.
    CPC ....... *F28F 9/02* (2013.01); *B01J 2219/00783* (2013.01); *B01J 2219/00806* (2013.01); *B01J 2219/00822* (2013.01); *B01J 2219/00835* (2013.01); *B21D 53/04* (2013.01); *F28F 2275/067* (2013.01)

(56) References Cited

FOREIGN PATENT DOCUMENTS

| KR | 20130078167 A | * | 7/2013 |
|---|---|---|---|
| KR | 10-1303437 | | 9/2013 |
| WO | WO 2011/051696 A1 | | 5/2011 |

* cited by examiner

HEAT EXCHANGE REACTOR USING THIN PLATE PROVIDED WITH FLOW PATH THEREIN AND METHOD OF MANUFACTURING THE SAME

TECHNICAL FIELD

The present invention relates to a heat exchange reactor and a method of manufacturing the same.

BACKGROUND ART

In a method of constructing a plate type heat exchanger in the related art, two side bars are disposed on both side surfaces of a division plate forming a channel, a heat exchange pin according to a height of the side bar is disposed between the division plates, and the side bars and the division plates are welded. In order to easily weld the side bars and the division plates by the method, a height of the side bar needs to have a predetermined size or greater, and thus, a lower limit of a height of the heat exchange pin is restricted.

In order to construct a plate type heat exchange reactor, the reactor has a general construction in which two kinds of flow path channel is provided so as to prevent two kinds of fluid from being mixed with each other, and the respective flow path channels are alternately stacked. In this case, a flow path, in which a reaction is performed, is referred to as a reaction flow path, and a flow path, in which the reaction is not performed, and through which a fluid for heat exchange flows, is referred to as a heat exchange flow path. In general, a catalyst for facilitating the reaction is installed in the reaction flow path. A method of supporting the catalyst on a surface of a structure body of a heat exchange plate is mainly used.

A printed circuit heat exchanger is a heat exchanger in which a flow path is processed by a method, such as etching and milling, on a metal thin plate, and the flow path is cross-stacked to form a flow path. Since a fine flow path is formed inside the metal thin plate to serve as a heat exchange flow path, the flow path may be used as a member for forming heat exchange flow path channels. A technique of the printed circuit heat exchanger is characterized in that an inlet/outlet may be formed so that fluids are not mixed in the reaction flow path even though a separate blocking plate is not used.

RELATED ART LITERATURE

Patent Document

1. JP 2001-183078
2. US 2007/0261873
3. WO 2011/051696

SUMMARY OF THE INVENTION

The present invention has been made in an effort to provide a heat exchange reactor, which does not separately require a heat exchange flow path channel, a heat exchange structure body, and a blocking plate, and a method of manufacturing the same.

The present invention has also been made in an effort to provide a heat exchange reactor, which may be easily manufactured, and reduce the number of components and costs, and a method of manufacturing the same.

The present invention has also been made in an effort to provide a heat exchange reactor, which may provide necessary mechanical strength, and has minimal thermal deformation during a welding operation, and a method of manufacturing the same.

An exemplary embodiment of the present invention provides a method of manufacturing a heat exchange reactor, including: preparing lateral plates provided with a plurality of slits formed in parallel in a longitudinal direction; disposing two lateral plates to be spaced apart from each other while facing each other in a vertical direction; forming a plurality of flow path channels by inserting flow path partition plates into one or more slits of the two lateral plates in a horizontal direction; forming a plurality of flow path channels by inserting printed circuit heat exchange plates, which autonomously include one or more heat exchange flow paths therein, into one or more slits of the two lateral plates in a horizontal direction; and bonding the lateral plates, the flow path partition plates, and the printed circuit heat exchange plates.

The two lateral plates may be finished by the printed circuit heat exchange plates so that upper ends and lower ends of the two lateral plates are connected with each other, so that the printed circuit heat exchange plates may be configured as an upper plate and a lower plate as the heat exchange reactor.

The flow path partition plates and the printed circuit heat exchange plates may be alternately disposed.

The slits may be divided into slits for inserting the flow path partition plates and slits for inserting the printed circuit heat exchange plates.

Thicknesses of each flow path partition plate and each slit for inserting the flow path partition plate may be 0.1 to 0.5 mm respectively.

Thicknesses of each printed circuit heat exchange plate and each slit for inserting the printed circuit heat exchange plate may be 1 to 3 mm respectively.

A thickness of each lateral plate may be 1 to 3 mm.

The slits may be formed except for both end parts of the lateral plates.

The method may further include cutting both end parts of the two lateral plates, in which the slits are not formed, after bonding the lateral plates, the flow path partition plates, and the printed circuit heat exchange plates.

The slits may be formed except for 5 to 10 mm from both ends in a longitudinal direction of each lateral plate.

The method may further include detachably inserting a heat exchange pin structure body having a shape, in which ribs and grooves are repeatedly connected, into one or more flow path channels.

The heat exchange pin structure body may be a heat exchange pin structure body for reaction on which a catalyst is coated or supported.

Another exemplary embodiment of the present invention provides a heat exchange reactor, including: two lateral plates, which include a plurality of slits formed in parallel in a longitudinal direction and are disposed to be spaced apart from each other while facing each other in a vertical direction; flow path partition plates inserted into one or more slits of the two lateral plates in parallel in a horizontal direction to form a plurality of flow path channels; and printed circuit heat exchange plates inserted into one or more slits of the two lateral plates in parallel in a horizontal direction to form a plurality of flow path channels, and autonomously including one or more heat exchange flow paths therein.

According to the exemplary embodiments of the present invention, the printed circuit heat exchange plate autonomously including the heat exchange flow paths therein is used as the flow path partition plate (division plate), so that it is not necessary to separately configure a heat exchange flow path channel, a heat exchange structure body, and a blocking plate, and thus, it is possible to simply and easily manufacture the heat exchange reactor.

Even though the flow path partition plate for dividing the plurality of flow path channels for reaction is configured by a thin plate, a relatively thick printed circuit heat exchange plate is used, so that it is possible to minimize thermal deformation even during a welding operation for fixing the slit.

It is possible to form the flow path channel for reaction by disposing two lateral plates provided with the slits to be spaced apart from each other, inserting the printed circuit heat exchange plates and the flow path partition plates into the respective slits, welding the printed circuit heat exchange plates and the flow path partition plates with external parts of the lateral plates, thereby reducing the number of welded regions and easily manufacturing the heat exchange reactor compared to the related art.

Side bar components are demanded as many as the number of flow path channels in the related art, but the lateral plates provided with the slits of the present invention configures lateral walls as a single component provided with the slits having less than 1 than the desired number of flow path channels, thereby reducing the number of components.

According to the exemplary embodiments of the present invention, it is possible to provide each necessary mechanical strength by varying a thickness of a member configuring an outer peripheral part and a thickness of a partition plate member for dividing an internal flow path channel space.

According to the exemplary embodiments of the present invention, it is possible to easily insert or remove the heat exchange pin structure body, on which the catalyst is coated or supported, into or from the flow path channels for reaction after the reactor is welded and assembled.

According to the exemplary embodiments of the present invention, the heat exchange pin structure body for reaction supported (coated) with the catalyst is inserted into the flow path channels for reaction after the reactor is welded and assembled, thereby minimizing thermal deformation of the heat exchange pin structure body for reaction.

DETAILED DESCRIPTION

Hereinafter, the present invention will be described in detail with reference to the accompanying drawings.

Figure 1:
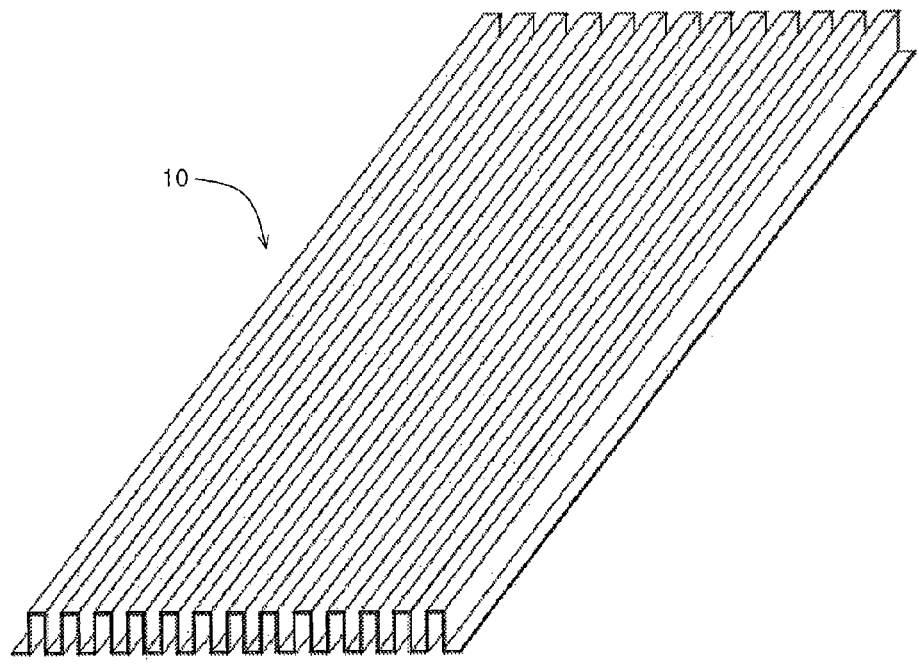
FIG. 1 is a perspective view illustrating an example of a heat exchange pin structure body usable in the present invention.

FIG. 1 is a perspective view illustrating an example of a heat exchange pin structure body 10 usable in the present invention, and the heat exchange pin structure body 10 is a metal structure body inserted as a heat exchange pin. The heat exchange pin structure body 10 may have a shape in which ribs and grooves are repeatedly connected as illustrated in FIG. 1. It is exemplified in the drawing that an upper part and a lower part of the heat exchange pin structure body 10 are straight forms, but may have zigzag shapes, wave shapes, and wrinkle shapes.

The heat exchange pin structure body 10 may be a heat exchange pin structure body for reaction on which a catalyst is coated or supported. All of the heat exchange pin structure bodies 10 used in the present invention may be the heat exchange pin structure body for reaction. Since the present invention uses a printed circuit heat exchange plate 20 autonomously including heat exchange flow paths 22 therein, it is not necessary to use a separate heat exchange pin structure body for heat exchange, and thus, it is possible to simply and easily manufacture a heat exchange pin structure body.

The heat exchange pin structure body 10 may be inserted into flow path channels 60, and preferably inserted into the flow path channels 60 after welding and assembling a reactor, thereby restricting or minimizing thermal deformation of the heat exchange pin structure body for reaction. Further, it may be possible to easily insert or remove the heat exchange pin structure body 10, on which the catalyst is coated or supported, into or from the flow path channels 60 for reaction after the reactor is welded and assembled.

Figure 2:
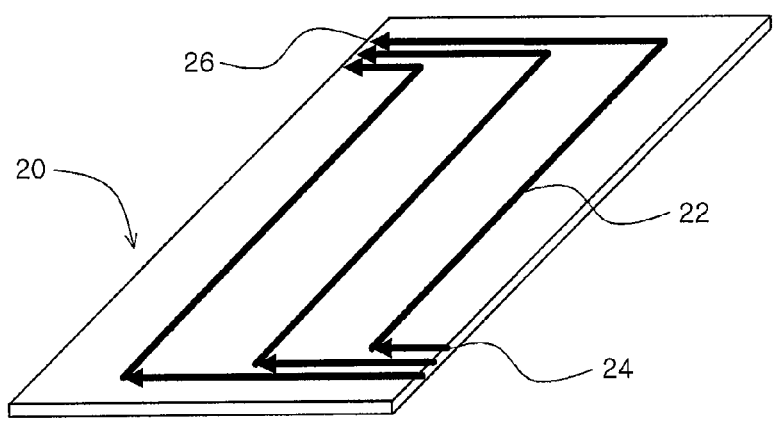
FIG. 2 is a perspective view illustrating an example of a printed circuit heat exchange plate usable in the present invention.

FIG. 2 is a perspective view illustrating an example of a printed circuit heat exchange plate 20 usable in the present invention, and the printed circuit heat exchange plate 20 may autonomously include one or more heat exchange flow paths therein. A plurality of heat exchange flow paths 22 may be formed. Each heat exchange flow path 22 may have an inlet 24 and an outlet 26.

The printed circuit heat exchange plate 20 may be configured by one plate, of which sealing is maintained except for the inlets 24 and the outlets 26 of the flow paths, by forming the heat exchange flow paths 22 on a thin plate through processing, such as etching or milling, and bonding a cover plate by using a bonding method, such as diffusion bonding or braising, to the thin plate provided with the heat exchange flow paths 22.

A thickness of the printed circuit heat exchange plate 20 may be preferably 0.5 to 5 mm, and more preferably 1 to 3 mm.

The printed circuit heat exchange plate 20 serves to cool or heat a fluid flowing, outside thereof, and to this end, a refrigerant, such as coolant, or a heating medium, such as hot water or warm water, may flow in the heat exchange flow paths 22.

Figure 3:
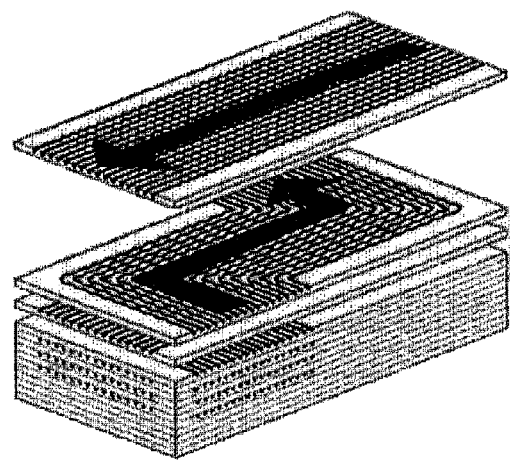
FIG. 3 is a perspective view illustrating an example of another printed circuit heat exchange plate usable in the present invention.

FIG. 3 is a perspective view illustrating an example of another printed circuit heat exchange plate usable in the present invention, and a pattern of a heat exchange flow path 22 is not particularly limited, and may have various patterns, such as a straight pattern, a curved pattern, and a zigzag pattern. The number, a cross-sectional shape, a diameter, an internal, and the like of the heat exchange flow paths 22 are not particularly limited, and may be appropriately set as necessary.

Figure 4:
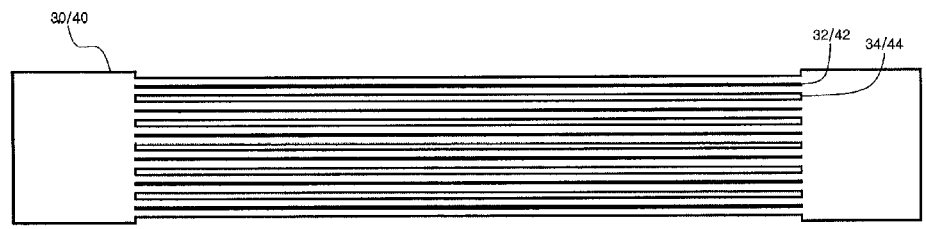
FIG. 4 is a top plan view of lateral plates in which a plurality of slits is formed according to the present invention.

FIG. 4 is a top plan view of lateral plates 30 and 40 in which a plurality of slits 32, 34, 42, and 44 is formed according to the present invention, and the lateral plates 30 and 40 may be configured with elongated rectangle metal thin plates. A thickness of the lateral plates 30 and 40 may be preferably 0.5 to 5 mm, and more preferably 1 to 3 mm.

The plurality of slits 32, 34, 42, and 44 may be formed in the lateral plates 30 and 40 in a longitudinal direction of the lateral plates 30 and 40. In the present invention, the slits 32, 34, 42, and 44 are formed in the lateral plates 30 and 40, so that it is possible to easily manufacture the heat exchange reactor and reduce the number of components and costs compared to the related art. That is, in the present invention, it is possible to configure lateral walls of the heat exchange reactor with a single component provided with the slits 32, 34, 42, and 44 without using a plurality of lateral bars, so that it is possible to easily manufacture the reactor and reduce costs.

Preferably, the respective slits 32, 34, 42, and 44 may be formed in parallel. The slits 32, 34, 42, and 44 may be formed in the lateral plates 30 and 40, except for both end parts of the lateral plates 30 and 40, and for example, the slits 32, 34, 42, and 44 may be formed in the lateral plates 30 and 40, except for preferably 3 to 15 mm, more preferably 5 to 10 mm, from both ends of the lateral plates 30 and 40 in the longitudinal direction. That is, as illustrated in the drawing, each of the parts, in which the slits 32, 34, 42, and 44 are not processed, may have a length of 5 to 10 mm. Accordingly, the slits 32, 34, 42, and 44 may be formed with a part of an entire length of each of the lateral plates 30 and 40.

The printed circuit heat exchange plate 20 and flow path partition plates 50 may be inserted into the slits 32, 34, 42, and 44. That is, the slits 32, 34, 42, and 44 may be divided into the slits 32 and 42 for inserting the flow path partition plate and the slits 34 and 44 for inserting the printed circuit heat exchange plate. Preferably, the slits 32 and 42 for inserting the flow path partition plate and the slits 34 and 44 for inserting the printed circuit heat exchange plate may be alternately disposed. Lengths and thicknesses of the slits 32 and 42 for inserting the flow path partition plate may be almost the same as a length and a thickness of the flow path partition plate 50, and similarly, lengths and thicknesses of the slits 34 and 44 for inserting the printed circuit heat exchange plate may be almost the same as a length and the thickness of the printed circuit heat exchange plate 20.

The slits 32, 34, 42, and 44 may be formed with the number one less than the number of flow path channels 60. The number of slits 32, 34, 42, and 44 may be (the total number of flow path channels)−1.

Elongated grooves having steps may be formed at upper ends and lower ends of the lateral plates 30 and 40. The grooves are for the purpose of accommodating the printed circuit heat exchange plate 20, and a length and a thickness of the groove may be almost the same as the length and the thickness of the printed circuit heat exchange plate 20. As described above, the two lateral plates 30 and 40 are finished by the printed circuit heat exchange plates 20 so that the upper ends and the lower ends of two lateral plates 30 and 40 are connected with each other, so that the printed circuit heat exchange plates 20 may also be configured as an upper plate and a lower plate of the heat exchange reactor.

Figure 5:
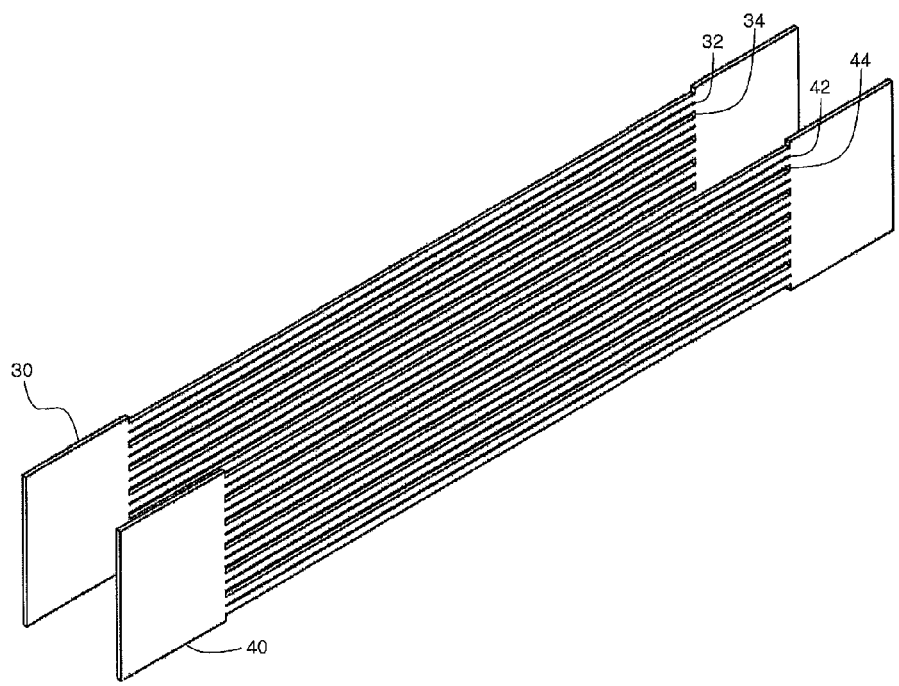
FIG. 5 is a perspective view illustrating the case where two lateral plates are disposed to be spaced apart from each other before inserting flow path partition plates for dividing flow path channels and the printed circuit heat exchange plate.

FIG. 5 is a perspective view illustrating the case where two lateral plates 30 and 40 are disposed to be spaced apart from each other before inserting the printed circuit heat exchange plate 20 and the flow path partition plates 50 for dividing the flow path channels according to the present invention, the lateral plates 30 and 40 provided with the plurality of slits 32, 34, 42, and 44 formed in parallel in the longitudinal direction are prepared, and then the two lateral plates 30 and 40 are vertically erected and disposed to be spaced apart from each other while facing each other. It may be defined that a disposition interval of the lateral plates 30 and 40 includes a distance between the lateral plates 30 and 40 and thicknesses of the lateral plates 30 and 40.

Figure 6:
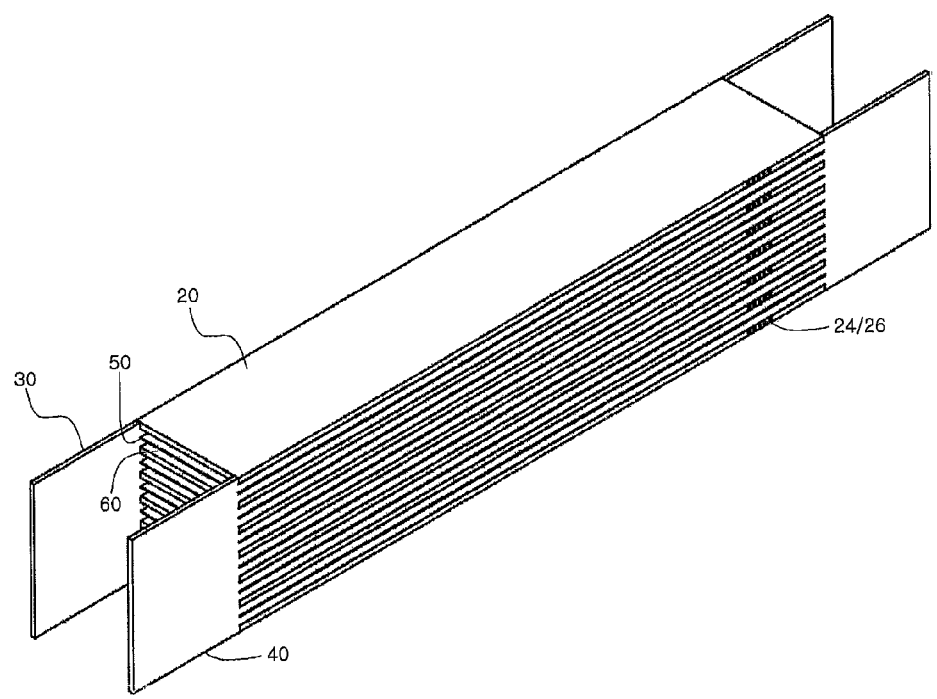
FIG. 6 is a perspective view of an assembly in which a flow path partition plate and the printed circuit heat exchange plate are inserted into the slits, respectively, and welded according to the present invention.

FIG. 6 is a perspective view of an assembly in which the printed circuit heat exchange plate 20 and the flow path partition plates 50 are inserted into the slits 32, 34, 42, and 44 of the lateral plates 30 and 40, respectively, and welded according to the present invention, and the plurality of flow path channels 60 is formed by inserting the plurality of printed circuit heat exchange plates 20 and the plurality of flow path partition plates 50 into the slits 32, 34, 42, and 44 of the two lateral plates 30 and 40, respectively, and then the lateral plates 30 and 40, the printed circuit heat exchange plates 20, and the flow path partition plates 50 are bonded. The insertion and the bonding of the printed circuit heat exchange plates 20 and the flow path partition plates 50 may be sequentially performed. The bonding may be performed by, for example, laser welding. As described above, the slits 32, 34, 42, and 44 are formed as many as the number of printed circuit heat exchange plates 20 and the number of flow path partition plates 50 for dividing a space of the internal flow path channels 60 in the lateral plate members 30 and 40 configuring the reactor, and the printed circuit heat exchange plates 20 and the flow path partition plates 50 are welded in the state where the printed circuit heat exchange plates 20 and the flow path partition plates 50 are inserted into the slits 32, 34, 42, and 44 of the formed lateral plates 30 and 40.

The flow path partition plate 50 may be an elongated rectangular metal plate. The flow path partition plate 50 may have a length and a thickness corresponding to the slits 32 and 42 for inserting the flow path partition plate. A thickness of the flow path partition plate 50 may be preferably 0.05 to 2 mm, and more preferably 0.1 to 0.5 mm.

The flow path channels 60 having the one more than the number of slits 32, 34, 42, and 44 may be formed by the printed circuit heat exchange plates 20 and the flow path partition plates 50. That is, the flow path channels 60 of more than one than the number of slits 32, 34, 42, and 44 may be formed by the printed circuit heat exchange plates 20 and the flow path partition plates 50.

In the present invention, all of the flow path channels 60 may be flow path channels for reaction. As described above, since the printed circuit heat exchange plate 20 already and autonomously has a heat exchange function, all of the flow path channels 60 may be flow path channels for reaction without a necessity for separately providing a flow path channel for heat exchange.

The three-dimensional flow path channels 60 are already formed while performing welding, and in order to maintain and support a shape and an interval (height) of the flow path channel 60, an inserted material having a similar height (thickness) to that of the flow path channel 60 may be installed and the welding may be performed. In this case, a heat exchange pin structure body detachable from the channel or a metal plate having a curve may be used as the inserted material.

Figure 7:
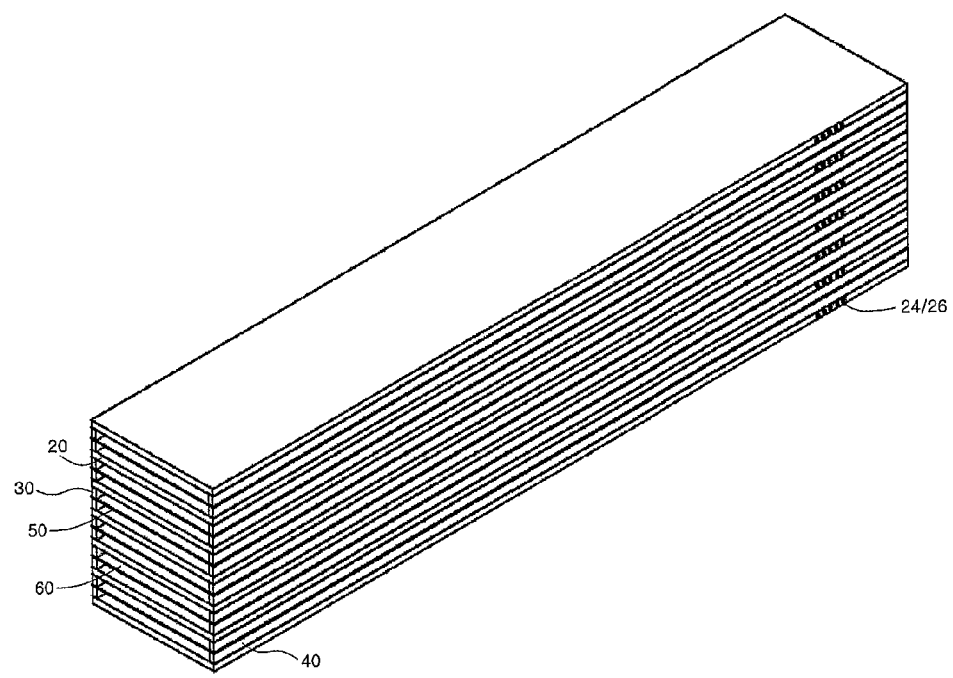
FIG. 7 is a perspective view of the assembly in which both end parts of the lateral plates, in which the slits are not formed, are cut in the assembly according to FIG. 6.

FIG. 7 is a perspective view of the assembly in which both end parts of the lateral plates 30 and 40, in which the slits 32, 34, 42, and 44 are not formed, are cut in the assembly according to FIG. 6, and when both end parts of the two lateral plates 30 and 40, in which the slits are not formed, are cut after the bonding the lateral plates 30 and 40, the printed circuit heat exchange plates 20, and the flow path partition plates 50, inlet and outlet flow paths are formed and a main body of the heat exchange reactor according to the present invention is completed. The inlet 24 or the outlet 26 of the printed circuit heat exchange plate 20 may be exposed through one lateral surface of the heat exchange reactor, and the outlet 26 or the inlet 24 of the printed circuit heat exchange plate 20 may be exposed through the other lateral surface of the heat exchange reactor.

Figure 8:
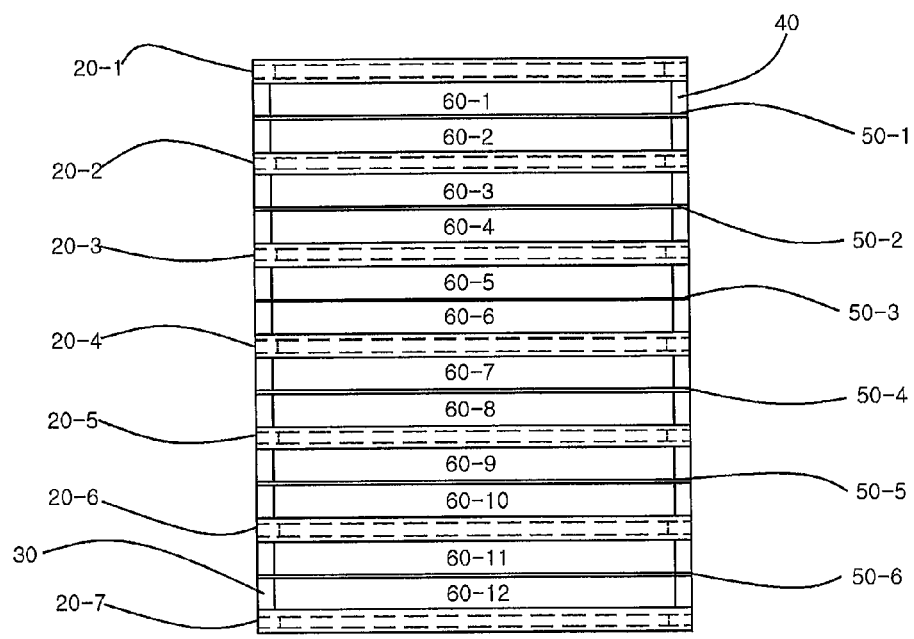
FIG. 8 is a front view of the assembly according to FIG. 7.

FIG. 8 is a front view of the assembly according to FIG. 7, and a total of five printed circuit heat exchange plates 20-2 to 20-6 and a total of six flow path partition walls 50-1 to 50-6 are inserted into a total of 11 slits 32, 34, 42, and 44 of the lateral plates 30 and 40, so that a total of 12 flow channels 60-1 to 60-12 are formed. The number of flow path channels 60 is not particularly limited, and may be appropriately changed as necessary. A part indicated with a dotted line in the drawing indicates the heat exchange flow paths 22 formed inside the printed circuit heat exchange plates 20.

The topmost printed circuit heat exchange plate 20-1 and the lowermost printed circuit heat exchange plate 20-7 are inserted into grooves formed at the upper end and the lower end of the lateral plates 30 and 40, not the slits 32, 34, 42, and 44, and may be configured as an upper plate and a lower plate of the heat exchange reactor, respectively. The printed circuit heat exchange plates 20 are configured as the upper plate and the lower plate of the heat exchange reactor, so that the upper plate and the lower plate are not separately required.

As described above, when the printed circuit heat exchange plates 20 are used as the flow path partition plates, it is possible to divide the adjacent flow path channels 60 for reaction. Further, when the flow path partition plate 50 having a smaller thickness than that of the printed circuit heat exchange plate 20 in order to form multiple flow path channels 60 for reaction, a section of the flow path channel 60 including a plurality of layers may be formed between one printed circuit heat exchange plate 20 and the next printed circuit heat exchange plate 20.

When the slits having the same thickness are formed and only the flow path partition plates are used unlike to the present invention, a blocking plate having a comb shape needs to be formed at both ends of the flow path channels so as to prevent fluids of a flow path channel for reaction and a flow path channel for heat exchange from being mixed, but in the present invention, the printed circuit heat exchange plate 20 autonomously including the heat exchange flow paths 22 is used, so that a blocking plate is not necessary, and thus, it is possible to easily manufacture the reactor.

Even though a partition wall between the multiple flow path channels 60 for reaction is configured by a plate having a thickness of about 0.3 to 0.5 mm, the printed circuit heat exchange plate 20 autonomously including the heat exchange flow paths 22 has a thickness of about 2±1 mm, so that even though a welding operation for fixing the slit is performed, a slightly thick plate material is used, so that thermal deformation may be minimal. When thermal deformation is minimized while forming the flow path, the welding operation may be performed while reducing a cooling time of the plate material during the welding operation, so that it is possible to easily manufacture the reactor.

Figure 9:
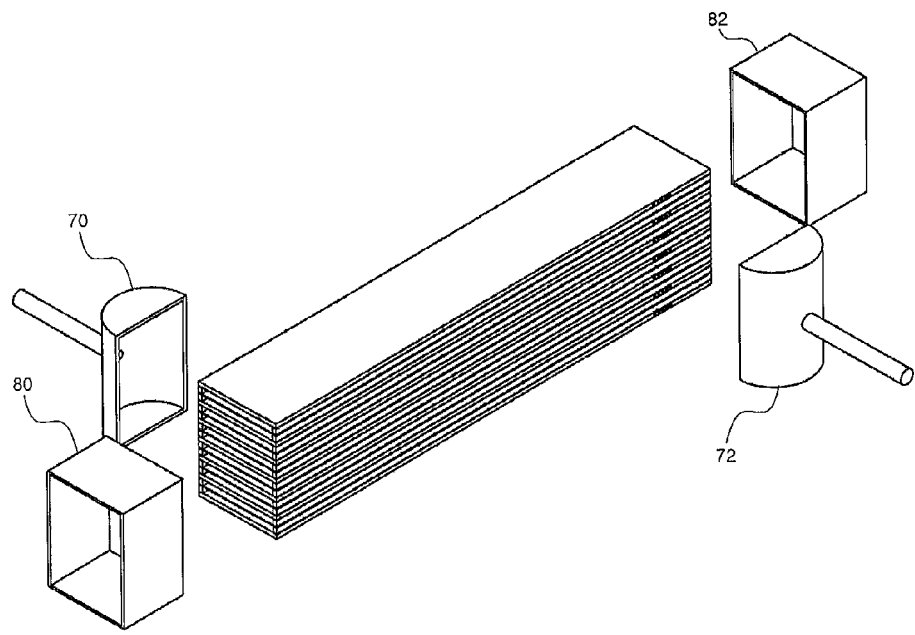
FIG. 9 is a perspective view illustrating the case before a manifold for an inlet/outlet is assembled with the assembly according to FIG. 7.
Figure 10:
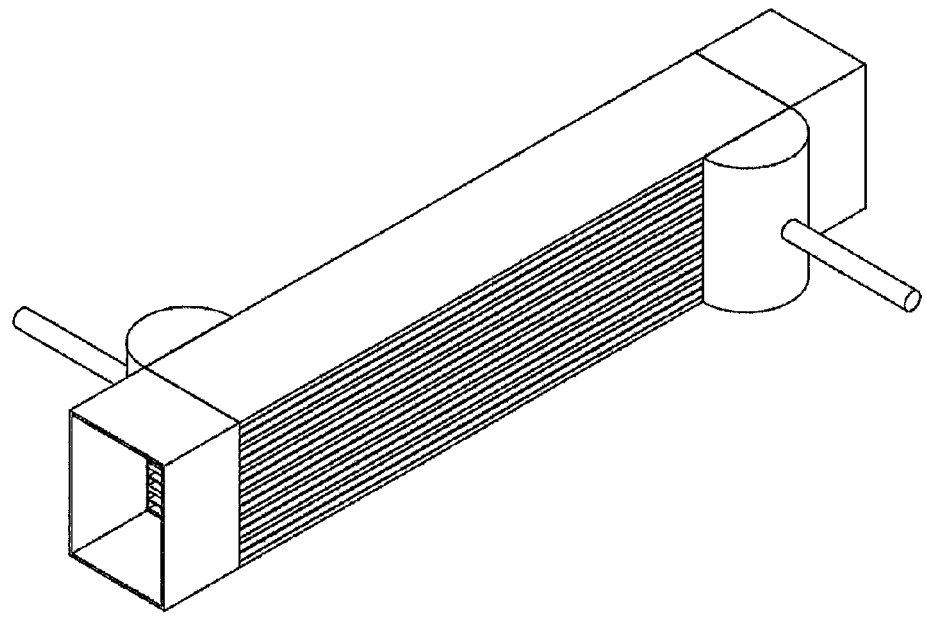
FIG. 10 is a perspective view illustrating a heat exchange reactor completed by assembling the manifold for the inlet/outlet with the assembly according to FIG. 7.
Figure 11:
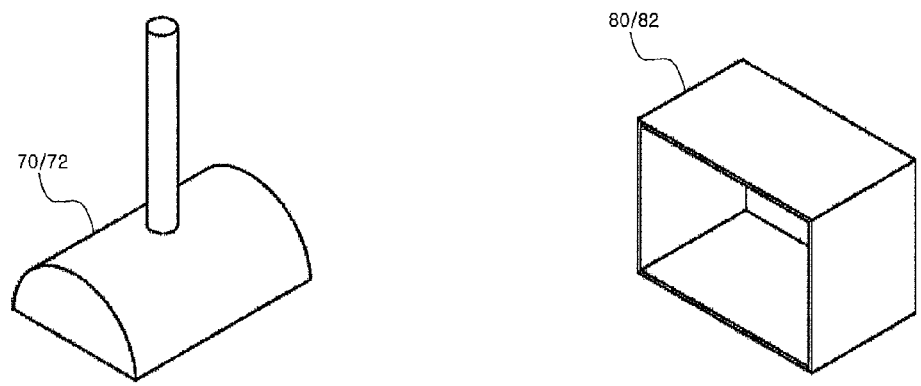
FIG. 11 is a perspective view of the manifold for the inlet/outlet.

FIG. 9 is a perspective view illustrating the case before a manifold for an inlet/outlet is assembled with the assembly according to FIG. 7, FIG. 10 is a perspective view illustrating a heat exchange reactor completed by assembling the manifold for the inlet/outlet with the assembly according to FIG. 7, and FIG. 11 is a perspective view of the manifold for the inlet/outlet, in which first manifolds 70 and 72 for forming an inlet and the outlet of the reactor may be assembled with both lateral surfaces of the assembly according to FIG. 7, respectively, so that a fluid, such as a coolant, may flow in or be discharged through the inlet 24 and the outlet 26 of the printed circuit heat exchange plate 20, and second manifolds 80 and 82 for forming an inlet and an outlet of the reactor may be assembled with a front surface and a rear surface of the assembly according to FIG. 7, respectively, so that a fluid for reaction may flow in or be discharged through the flow path channel 60 for reaction. Shapes, sizes, and the like of the manifolds 70, 72, 80, and 82 are not limited to the drawing, and may be variously changed as necessary.

What is claimed is:

1. A method of manufacturing a heat exchange reactor; comprising:

preparing two lateral plates provided with a plurality of slits formed in parallel in a longitudinal direction, wherein the slits are not formed in opposed end parts of the two lateral plates, wherein the slits are divided into slits for inserting flow path partition plates and slits for inserting printed circuit heat exchange plates;

disposing the two lateral plates, extending in a vertical direction and spaced apart from each other while facing each other;

forming a plurality of first flow path channels by inserting flow path partition plates into one or more slits of the slits for inserting flow path partition plates of the two lateral plates in a horizontal direction;

forming a plurality of second flow path channels dividing the plurality of first flow path channels by inserting printed circuit heat exchange plates, which autonomously include one or more heat exchange flow paths therein, into one or more slits of the slits for inserting printed circuit heat exchange plates of the two lateral plates in the horizontal direction;

bonding the lateral plates, the flow path partition plates, and the printed circuit heat exchange plates; and cutting the opposed end parts of the two lateral plates, in which the slits are not formed, after bonding the lateral plates, the flow path partition plates, and the printed circuit heat exchange plates, such that the lateral plates do not extend beyond the flow path partition plates and the printed circuit heat exchange plates in the longitudinal direction.

2. The method of claim 1, wherein the two lateral plates are finished by the printed circuit heat exchange plates so that upper ends and lower ends of the two lateral plates are connected with each other, so that the printed circuit heat exchange plates are configured as an upper plate and a lower plate as the heat exchange reactor.

3. The method of claim 1, wherein the flow path partition plates and the printed circuit heat exchange plates are alternately disposed.

4. The method of claim 1, wherein thicknesses of each flow path partition plate and each slit for inserting the flow path partition plate are 0.1 to 0.5 mm respectively.

5. The method of claim 1, wherein thicknesses of each printed circuit heat exchange plate and each slit for inserting the printed circuit heat exchange plate are 1 to 3 mm respectively.

6. The method of claim 1, wherein a thickness of each lateral plate is 1 to 3 mm.

7. The method of claim 1, wherein a length of each end part of each lateral plate is 5 to 10 mm.

8. The method of claim 1, further comprising:
   detachably inserting a heat exchange pin structure body having a shape, in which ribs and grooves are repeatedly connected, into one or more flow path channels of the plurality of second flow path channels.

9. The method of claim 8, wherein the heat exchange pin structure body is a heat exchange pin structure body for reaction on which a catalyst is coated or supported.

* * * * *